United States Patent
Holt et al.

(10) Patent No.: US 10,482,379 B2
(45) Date of Patent: Nov. 19, 2019

(54) SYSTEMS AND METHODS TO PERFORM MACHINE LEARNING WITH FEEDBACK CONSISTENCY

(71) Applicant: Google Inc., Mountain View, CA (US)

(72) Inventors: Jason E. Holt, Mountain View, CA (US); Marcello Mathias Herreshoff, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 627 days.

(21) Appl. No.: 15/222,997

(22) Filed: Jul. 29, 2016

(65) Prior Publication Data

US 2018/0032871 A1     Feb. 1, 2018

(51) Int. Cl.
*G06N 3/08* (2006.01)
*G06N 3/04* (2006.01)

(52) U.S. Cl.
CPC ........... *G06N 3/084* (2013.01); *G06N 3/0454* (2013.01)

(58) Field of Classification Search
CPC ........ G06N 3/02; G06N 3/084; G06N 3/0454; G06E 1/10; G06F 17/20; G06F 3/165; G10L 15/22
See application file for complete search history.

(56) References Cited

U.S. PATENT DOCUMENTS

| 5,005,147 A | 4/1991 | Krishen et al. |
| 5,548,683 A | 8/1996 | Engel et al. |
| 6,594,620 B1 | 7/2003 | Qin et al. |
| 7,039,621 B2 | 5/2006 | Agrafiotis et al. |
| 7,293,400 B2 | 11/2007 | Taware et al. |
| 7,409,372 B2 | 8/2008 | Staelin et al. |
| 7,646,336 B2 | 1/2010 | Tan et al. |
| 7,660,774 B2 | 2/2010 | Mukherjee et al. |
| 8,484,022 B1 | 7/2013 | Vanhoucke |
| 8,756,173 B2 | 6/2014 | Hunzinger et al. |
| 8,972,316 B2 | 3/2015 | Nugent |

(Continued)

OTHER PUBLICATIONS

Riemens, "Using convolutional autoencoders to improve classification performance", Radbound University Nijmegen, 1-37 (Year: 2015).*

(Continued)

*Primary Examiner* — Hal Schnee
*Assistant Examiner* — Van C Mang
(74) *Attorney, Agent, or Firm* — Dority & Manning, P.A.

(57) ABSTRACT

The present disclosure provides systems and methods that enable training of an encoder model based on a decoder model that performs an inverse transformation relative to the encoder model. In one example, an encoder model can receive a first set of inputs and output a first set of outputs. The encoder model can be a neural network. The decoder model can receive the first set of outputs and output a second set of outputs. A loss function can describe a difference between the first set of inputs and the second set of outputs. According to an aspect of the present disclosure, the loss function can be sequentially backpropagated through the decoder model without modifying the decoder model and then through the encoder model while modifying the encoder model, thereby training the encoder model. Thus, an encoder model can be trained to have enforced consistency relative to the inverse decoder model.

20 Claims, 9 Drawing Sheets

(56) References Cited

U.S. PATENT DOCUMENTS

| | | | |
|---|---|---|---|
| 9,153,231 B1* | 10/2015 | Salvador | G10L 15/065 |
| 10,165,251 B2* | 12/2018 | Lakshminarayanan | H04N 19/597 |
| 2006/0047482 A1 | 3/2006 | Yuan et al. | |
| 2006/0074496 A1 | 4/2006 | Taware et al. | |
| 2014/0240464 A1* | 8/2014 | Lee | G01S 17/08 348/47 |
| 2017/0068888 A1* | 3/2017 | Chung | G06N 3/084 |
| 2017/0091168 A1* | 3/2017 | Bellegarda | G06F 17/276 |
| 2017/0169811 A1* | 6/2017 | Sabbavarapu | G06F 3/165 |
| 2017/0372201 A1* | 12/2017 | Gupta | G06N 3/084 |

OTHER PUBLICATIONS

Amiri, "Learning Text Pair Similarity with Context-sensitive Autoencoders", Association for Computational Linguistics (Year: 2016).*

O'Shea, "Learning to Communicate: Channel Auto-encoders, Domain Specific Regularizers, and Attention", IEEE (Year: 2016).*

Kamruzzaman et al.,"Inverse Neural Network Metamodels", *Artificial Neural Networks in Finance and Manufacturing*, Hershey, Pennsylvania, Idea Group Publishing, 2006, pp. 170-175.

Alain et al., "Gated Autoencoders with Tied Input Weights", Proceedings of the 30$^{th}$ International Conference on Machine Learning, Atlanta, Georgia, Jun. 16-21, 2013, pp. 154-162.

Hong, "Neural-Network-Based Sensor Fusion of Optical Emission and Mass Spectroscopy Data for Real-Time Fault Detection in Reactive Ion Etching", IEEE Transactions on Industrial Electronics, vol. 52, issue 4, Aug. 1, 2005, pp. 1063-1072.

Shinki et al., "Approximation of Inverse System (Many-Valued Function) by Neural Network", Electronics and Communications in Japan (Part III: Fundamental Electronic Science), vol. 84, Issue 8, Aug. 2001, pp. 57-66.

Yaginuma et al., "Multi-Sensor Fusion Model for Constructing Internal Representation Using Autoencoder Neural Networks", IEEE International Conference on Neural Networks, Washington, DC, Jun. 3-6, 1996, pp. 1646-1651 vol. 3.

Zhang, "Multimodal Fusion for Sensor Data Using Stacked Autoencoders", IEEE Tenth International Conference on Intelligent Sensors, Sensor Networks and Information Processing, Singapore, Apr. 7-9, 2015, pp. 1-2.

* cited by examiner

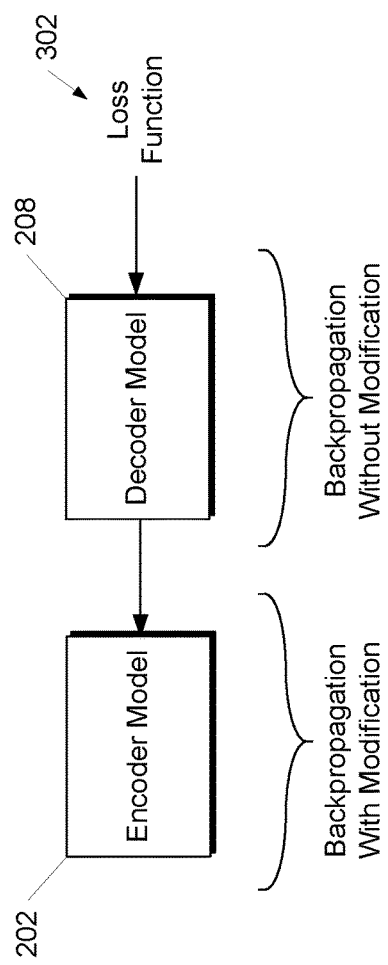
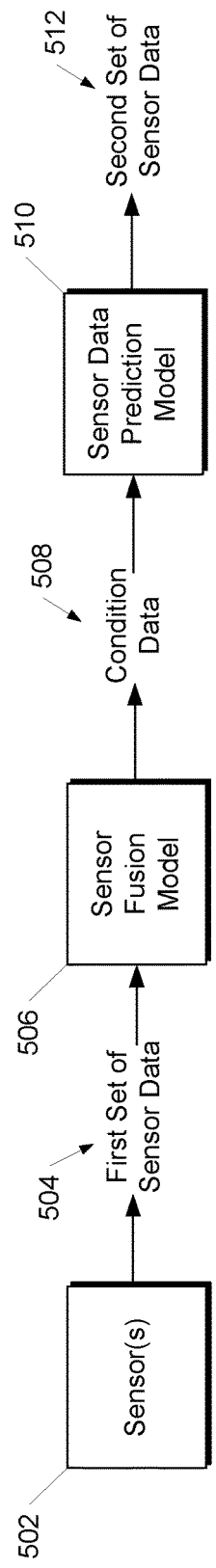
Figure 4
Figure 5

SYSTEMS AND METHODS TO PERFORM MACHINE LEARNING WITH FEEDBACK CONSISTENCY

FIELD

The present disclosure relates generally to machine learning. More particularly, the present disclosure relates to systems and methods to perform machine learning with feedback consistency.

BACKGROUND

Machine learning generally refers to a field of computer science that is focused on enabling machines such as computers to learn without being explicitly programmed. Machine learning includes the study and construction of machine-performed algorithms or techniques that enable machines to learn from and make predictions on data. In particular, such algorithms can operate by building a model from a training set of input observations in order to make data-driven predictions or decisions expressed as outputs, rather than following strictly static programming instructions.

One main branch of machine learning techniques includes supervised learning techniques. Supervised learning can include inferring or learning a function or model from a training data set that includes a number of labeled examples. For example, each example in the training data set can include one or more input values (which can be expressed as a vector with a number of features) and one or more desired output values (which can also be called supervisory signals). Typically, training data is labeled using known ground truth information that provides the input values and the output values. A supervised machine learning algorithm can analyze the training data and produce an inferred model, which can then be used for mapping or making predictions on new, unlabeled examples. However, in many scenarios, labeled data and/or ground truth data can be difficult and/or costly to obtain. Thus, performing supervised learning in such scenarios can be difficult or impossible.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to perform machine learning. The method includes obtaining, by one or more computing devices, data descriptive of an encoder model that is configured to receive a first set of inputs and, in response to receipt of the first set of inputs, output a first set of outputs. The method includes obtaining, by the one or more computing devices, data descriptive of a decoder model that is configured to receive the first set of outputs and, in response to receipt of the first set of outputs, output a second set of outputs. The method includes determining, by the one or more computing devices, a loss function that describes a difference between the first set of inputs and the second set of outputs. The method includes backpropagating, by the one or more computing devices, the loss function through the decoder model without modifying the decoder model. The method includes, after backpropagating, by the one or more computing devices, the loss function through the decoder model, continuing to backpropagate, by the one or more computing devices, the loss function through the encoder model to train the encoder model. Continuing to backpropagate, by the one or more computing devices, the loss function through the encoder model to train the encoder model includes adjusting, by the one or more computing devices, at least one weight included in the encoder model.

Another example aspect of the present disclosure is directed to a computing system to perform machine learning. The computing system includes at least one processor and at least one tangible, non-transitory computer-readable medium that stores instructions that, when executed by the at least one processor, cause the computing system to obtain data descriptive of a model that includes an encoder model and a decoder model. The encoder model is configured to receive a first set of inputs and, in response to receipt of the first set of inputs, output a first set of outputs. The decoder model is configured to receive the first set of outputs and, in response to receipt of the first set of outputs, output a second set of outputs. Execution of the instructions causes the computing system to determine a loss function that describes a difference between the first set of inputs and the second set of outputs. Execution of the instructions causes the computing system to backpropagate the loss function through the decoder model without modifying the decoder model. Execution of the instructions causes the computing system to, after backpropagating the loss function through the decoder model, continue to backpropagate the loss function through the encoder model while modifying the encoder model to train the encoder model.

Another example aspect of the present disclosure is directed to a computing system that includes at least one processor and at least one memory that stores a machine-learned encoder model that is configured to receive a first set of inputs and output a first set of outputs, the encoder model having been trained by sequentially backpropagating a loss function through a decoder model without modifying the decoder model and then through the encoder model to modify at least one weight of the encoder model, the decoder model configured to receive the first set of outputs and output a second set of outputs, the loss function descriptive of a difference between the first set of inputs and the second set of outputs.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 4 depicts a block diagram of an example model training technique according to example embodiments of the present disclosure.

FIG. 5 depicts a block diagram of an example model arrangement according to example embodiments of the present disclosure.

DETAILED DESCRIPTION

Figure 1A:
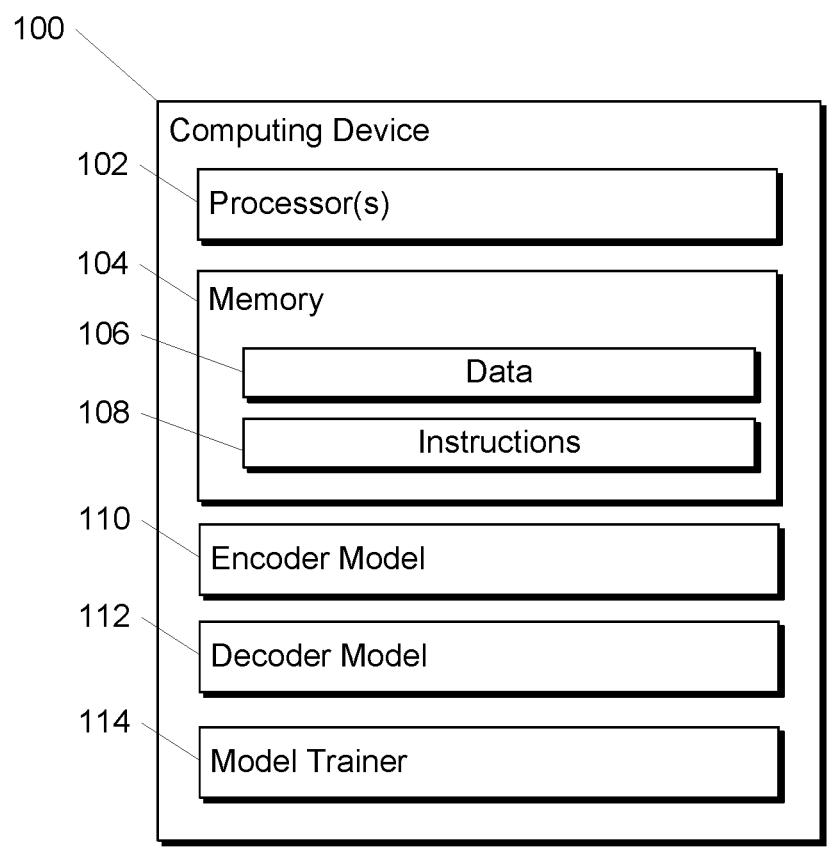
FIGS. 1A-1C depict block diagrams of example computing systems according to example embodiments of the present disclosure.

The present disclosure provides systems and methods that enable training of an encoder model based on a decoder model that performs an inverse transformation relative to the encoder model. In one example, an encoder model can receive a first set of inputs and output a first set of outputs. For example, the encoder model can be a neural network (e.g., a deep neural network). The decoder model can receive the first set of outputs and output a second set of outputs. A loss function can describe a difference between the first set of inputs and the second set of outputs. According to an aspect of the present disclosure, the loss function can be sequentially backpropagated through the decoder model without modifying the decoder model and then through the encoder model while modifying the encoder model, thereby training the encoder model. Thus, an encoder model can be trained to have enforced consistency relative to the inverse decoder model. This optionally enables training of the encoder model using unlabeled data, thereby eliminating or at least reducing the need for labeled data and/or ground truth data, which may be difficult and/or costly to obtain in certain scenarios. The present disclosure further optionally enables training of the encoder in the field, as the encoder model is trained based on the output of the decoder model, thereby eliminating the need for aggregation of data from multiple other devices or sources to build a training data set. Thus, the present disclosure provides a novel machine learning technique with feedback consistency. In particular, the present disclosure provides systems and methods that provide enforced consistency through use of an inverse model.

More particularly, according to an aspect of the present disclosure, an encoder model can be configured to receive a first set of inputs and, in response to receipt of the first set of inputs, output a first set of outputs. The encoder model can be, for example, a neural network such as a deep neural network or other multi-layer non-linear model.

In some implementations, the first set of inputs can be expressed according to a first set of dimensions and the first set of outputs can be expressed according to a second set of dimensions that are different than the first set of dimensions. The second set of dimensions can include a relatively smaller number of dimensions that the first set of dimensions or vice versa. Further, in some implementations, the first set of inputs can include unlabeled, real-world data that includes noise.

According to another aspect of the present disclosure, a decoder model can perform an inverse transformation relative to the encoder model. In particular, the decoder model can be configured to receive the first set of outputs and, in response to receipt of the first set of outputs, output a second set of outputs. In some implementations, the second set of outputs can be expressed according to the first set of dimensions. Thus, in some implementations, while the encoder model transforms data from the first set of dimensions to the second set of dimensions, the decoder model transforms data from the second set of dimensions back into the first set of dimensions. As such, the decoder model can be said to have performed an inverse transformation relative to the encoder model.

In this respect, the encoder model and decoder model of the present disclosure, when taken together, are in some respects similar to an autoencoder. For example, an autoencoder can typically include an encoder portion and a decoder portion. However, autoencoders are typically trained to attempt to exactly reconstruct the original inputs. That is, the decoder portion of an autoencoder is actively trained to and attempts to exactly reconstruct the inputs that were actually provided to the encoder portion of the autoencoder.

However, according to aspects of present disclosure, the decoder model of the present disclosure is not trained and does not attempt to exactly reconstruct the first set of inputs that were actually provided to the encoder model. Instead, in some implementations, the decoder model of the present disclosure attempts to provide a second set of outputs that recreate a hypothetical, ideal first set of inputs that could have resulted in or otherwise correspond to the first set of outputs that were output by the encoder model. By training the encoder model to minimize a loss between the actual inputs and such hypothetical, ideal inputs, the encoder model can learn to identify and ignore portions of the actual inputs that are not ideal or otherwise inaccurate, such as noise contained within the actual inputs. This principle will become better understood with reference to the example applications of the present disclosure described below.

In one example application of the present disclosure, the encoder model can be a sensor fusion model. In particular, a sensor fusion model can receive a set of sensor data reported by a plurality of sensors as an input. In response to receipt of the set of sensor data, the sensor fusion model can output a set of condition data. The set of condition data can be descriptive of a condition that is evidenced by the set of sensor data.

In one particular example, the plurality of sensors can include one or more of an accelerometer, a magnetometer, a global positioning system, a gyroscope, an inertial motion unit, an odometer, etc., while the set of condition data can be a set of pose data that describes a pose of a mobile device that includes the plurality of sensors. For example, the set of pose data can be a set of six degree of freedom pose data that describes the pose of the mobile device in six degrees of freedom.

Thus, in general, a sensor fusion model can receive a set of sensor data as inputs and, in response to receipt of the set of sensor data, output a set of condition data that describes a condition (e.g., a device pose) that is evidenced by the set of sensor data.

Such a sensor fusion model is useful in a large number of various scenarios, including as examples, pose estimation, image fusion, system and/or component condition monitoring or anomaly detection, or any other scenario in which the processing of multiple sources or types of sensor data to reach a conclusion is useful. However, creation of an accurate and robust sensor fusion model is a challenging process. In particular, sensor fusion models have traditionally taken the form of a hand-crafted sensor fusion algorithm that combines a number of techniques to attempt to fuse the sensor data. For example, in the case of pose estimation, the merging of data from inertial measurement units with noisy absolute position sensors (e.g., a global positioning system) normally involves the use of coordinate transforms, a pose estimation technique (e.g., SolvePNP and Kalman filters), and/or other techniques. These techniques can include a number of tunable parameters which can require significant amounts of tuning (e.g., manual adjustment) to eventually arrive at a usable sensor fusion model.

However, according to aspects of the present disclosure, a sensor fusion model of the present disclosure can be implemented as a machine-learned model (e.g., a neural network) rather than taking the form of a traditional hand-crafted sensor fusion algorithm. Typically, training such a machine-learned sensor fusion model would require a labeled training set in which a set of training sensor data is labeled with known ground truths. However, the systems and methods of the present disclosure can train such a machine-learned sensor fusion model based on an inverse model, thereby enabling training of the sensor fusion model without ground truth data, and further enabling training of the sensor fusion model as it is used in the field with real sensor data.

In particular, consider the inverse to the sensor fusion model, which can be referred to as a sensor data prediction model. The sensor data prediction model can receive as inputs the set of condition data that was output by the sensor fusion model. In response to receipt of the set of condition data, the sensor data prediction model can predict a second set of sensor data. In some implementations, the second set of sensor data can include or represent sensor readings that would be expected to result from the condition described by the set of condition data. Thus, the sensor data prediction model can perform an inverse transformation relative to the sensor fusion model.

For example, in the case of pose estimation, the sensor data prediction model can be a model that takes a series of poses (e.g., six degree of freedom positions) that represents the motion of the plurality of sensors through space and then computes the acceleration, rotation, or other sensor values expected to result from such series of poses/motion if the sensors were ideally operating. Stated differently, the sensor data prediction model provides a second set of sensor data that represents what an ideal set of sensors should have reported in light of experiencing the series of poses. Thus, in response to receipt of the set of pose data, the sensor data prediction model can output a second set of sensor data that represents what an ideal set of sensors should have reported given the set of pose data.

In some instances, the sensor data prediction model can be easier to produce or otherwise create than the sensor fusion model. For example, in some instances, the sensor fusion model may be required to perform dimensionality reduction or to make some judgments regarding the value or weight of some input sensor data relative to other input sensor data (e.g., identify and disregard sensor noise). On the other hand, the sensor data prediction model may only be required to compute expected sensor readings that would result from the condition described by the output of the sensor fusion model. Such computation of expected sensor readings may require only the application of known principles or relationships between the condition, which represents harmonized input data, and the expected sensor readings.

As one example, in the case of pose estimation, the sensor data prediction model is easier to create than the sensor fusion model because the set of pose data input into the sensor data prediction model comes in a canonical reference frame (e.g., six degrees of freedom) and represents harmonized input data. For example, calculation of acceleration from one known pose to another known pose requires only application of well-known principles of physics. By comparison, the sensor fusion model is required to harmonize a plurality of different noisy sensors and transform such sensor data into the reference frame (e.g., six degrees of freedom), which is a much more difficult task. Thus, the present disclosure can be particularly beneficial in any scenario in which generation of an accurate version of the decoder model represents a relatively easier task than generation of an accurate version of the encoder model.

Having implemented the sensor data prediction model, one possible technique is to create an additional model or function that creates a random set of conditions (e.g., a random realistic journey through space as a series of poses, such as six degree of freedom poses). This random set of conditions can be input into the sensor data prediction model and sets of expected sensor data can be received as outputs from the sensor data prediction model, thereby creating a set of synthetic, labeled training data usable to train the sensor fusion model.

One downside of the above described technique to create synthetic training data is that it does not accurately mimic real-world noisy sensors. Thus, when a sensor fusion model that was trained using such synthetic data is applied to predict a condition based on a particular set of real-world sensor data that contains particular types of noise, the sensor fusion model may not be able to appropriately account for such noise.

Another possible technique to train the sensor fusion model is to obtain a set of labeled training data using some ground truth system. However, for many scenarios, collection or creation of such a labeled training data set is impractical and/or cost-prohibitive. For example, in the case of a sensor fusion model that performs pose estimation, a set of labeled training data can be obtained through use of a motion capture studio. For example, sensor data from the device can be labeled with ground truth poses of the device as provided by the motion capture studio.

One downside to this approach is that the sensor fusion model may unknowingly be trained on unintended features in the training environment, like the noise characteristics of the motion capture studio or a particular error or other noise present in a particular sensor (e.g., inertial motion unit) of the particular device used to create the training set. In addition, use of such a motion capture studio may represent a significant cost. Thus, even given use of an advanced motion capture studio to produce labeled training data, the resulting trained sensor fusion model may include errors and/or may be device-specific and not suitable for export to devices other than the particular device used in the motion capture studio.

As such, according to aspects of the present disclosure, the sensor fusion model can be trained based at least in part on the output of a sensor data prediction model that received as input the output of the sensor fusion model. Thus, rather than attempting to create synthetic or ground truth training data as described above, consistency can be enforced between the sensor fusion model and its inverse sensor data prediction model.

To provide one example of such principle, to train the sensor fusion model, the set of condition data (e.g., set of pose data) output by the sensor fusion model can be input into the sensor data prediction model. As described, the sensor data prediction model can then output a second set of sensor data that includes sensor readings that would be expected to result from the condition described by the set of condition data output by the sensor fusion model. For example, in the instance of pose estimation, the sensor data prediction model predicts what ideal sensors would have reported based on poses (e.g., a sequence of six degree of freedom poses) described by the set of pose data output by the sensor fusion model.

A loss function can describe a difference between the first set of sensor data and the second set of sensor data. For example, the loss function can be a squared difference between the sets of sensor data. To train the sensor fusion model, the loss function can be sequentially backpropagated through the sensor data prediction model without modifying the sensor data prediction model and then through the sensor fusion model while modifying the sensor fusion model, thereby training the sensor fusion model to provide outputs that minimize the difference between the first set of actual sensor data and the second set of ideal sensor data.

In effect, the sensor fusion model is trained to produce a set of condition data that reflects conditions that could have produced the sensor readings that were provided to the sensor fusion model. For example, in the case of pose estimation, the sensor fusion model is trained to produce a set of pose data that describes a series of pose (e.g., six degree of freedom poses) that could have produced the sensor readings it was provided.

In some instances, the above described technique leverages redundancy present in the input sensor data. For example, for sensor data without redundancy, the sensor fusion model may be susceptible to simply providing outputs that correspond to the noise and the sensor data prediction model may then provide ideal sensor data that also corresponds to the noise since the condition reflects such noise. However, for sensor data that includes redundancy, the sensor fusion model can learn to ignore minority portions of sensor data that are noisy in favor of majority portions of sensor data that do not contain noise, thereby minimizing the difference with the second set of sensor data provided by the data prediction model.

As one simplified example for the purpose of explanation, assume that an example set of input sensor data includes readings from four sensors, where a first sensor erroneously indicates that the device is constantly accelerating while the other three sensors correctly indicate that the device is stationary. Because of the redundancy in such example sensor data, the sensor fusion model will choose to output a pose that indicates the device is stationary rather than a pose that indicates that the device is constantly accelerating. In particular, a stationary pose will result in the sensor data prediction model outputting a second set of sensor data in which all four sensors indicate that the device is stationary, thereby resulting in a loss function in which only one of four sensors has different values. On the other hand, a pose with constant acceleration will result in the sensor data prediction model outputting a second set of sensor data in which all four sensors indicate that the device is constantly accelerating, thereby resulting in a loss function in which three of four sensors have different values. As such, since the sensor fusion model is trained to minimize the difference function, the sensor fusion model will ignore the erroneous sensor and output the stationary pose.

As is apparent from the above simplified example, the sensor fusion model will be penalized for the imperfections of its input sensors. For example, even when correctly providing the stationary pose in the example above, the loss function still reflected a difference between the first set of actual sensor data and second set of ideal sensor data with regards to the one sensor that erroneously indicated constant acceleration. However, the sensor fusion model can be trained to minimize the loss function, which will cause the sensor fusion model to identify which portions of the input sensor data are least congruous with the data as a whole and to ignore such portions.

One advantage of the above described technique is that all real-world sensor data can be used to refine the sensor fusion model, thereby allowing the sensor fusion model to be trained in the field and to respond to changes in the sensors over time. Thus, the systems and methods of the present disclosure eliminate the need for ground truth condition data from an external measurement system. In addition, the systems and methods of the present disclosure eliminate the need to manually adjust hand-tuned sensor fusion algorithms. Instead, the sensor fusion model can be quickly trained in the field using real-world sensor data. Furthermore, the systems and methods of the present disclosure can enable device-specific and, in fact, sensor-specific training of the sensor fusion model, including enabling the sensor fusion model to learn to adapt to changes in a particular sensor over time.

In another example application of the present disclosure, the encoder model can be a computer vision model. In particular, the computer vision model can receive a set of image data that is descriptive of one or more first frames of imagery that depict a scene. In response to receipt of the set of image data, the computer vision model can output a set of depth data that describes one or more depths associated with the scene depicted by the first frames of imagery. The inverse decoder model can be an image rendering model that receives the set of depth data and predicts a second set of image data. The second set of image data can include one or more second frames of imagery that depict the expected appearance of the scene in view of the set of depth data. Thus, the computer vision model can infer depth from a series of frames while the image rendering model can render what the frames should have looked like given the depth information produced by the computer vision model.

In yet another example application of the present disclosure, the encoder model can be a speech-to-text model. In particular, the speech-to-text model can receive a set of audio data that is descriptive of an utterance. In response to receipt of the set of audio data, the speech-to-text model can output a set of textual data that provides a textual transcript of the utterance. The inverse decoder model can be a text-to-speech model that receives the set of textual data and predicts a second set of audio data that includes a recreated utterance of the textual transcript.

In some implementations, the synthesized voice of the text-to-speech model may be different from the original speaker's voice. Thus, in some implementations, in addition to the textual data, the speech-to-text model can also output data that describes an inflection, a voice, or other characteristics associated with the utterance described by the original audio data. The text-to-speech model can use such additional data in simulating the original speaker's inflection, voice, and/or other characteristics.

In some implementations, in order to obtain the benefits of the techniques described herein, the user may be required to allow the collection and analysis of sensor information or other information associated with the user or the user's device. Therefore, in some implementations, users can be provided with an opportunity to control settings associated with whether programs or features collect such information. If the user does not allow collection and use of such signals, then the user may not receive the benefits of the techniques described herein. In some implementations, the user can also be provided with tools to revoke or modify consent. In addition, in some implementations, certain information or data can be treated in one or more ways before it is stored or used, so that personally identifiable information is removed.

Thus, the present disclosure provides systems and methods that enable training of an encoder model (e.g., sensor fusion model) based on a decoder model (e.g., sensor data prediction model) that performs an inverse transformation relative to the encoder model. The particular example applications described above are provided as examples only. The systems and methods of the present disclosure can be applied to train any encoder model through the use of any decoder model that performs an inverse transformation relative to the encoder model.

With reference now to the Figures, example embodiments of the present disclosure will be discussed in further detail.

Example Devices and Systems

FIG. 1A depicts a block diagram of an example computing device 100 according to example embodiments of the present disclosure. The computing device 100 can be configured or operable to perform aspects of the present disclosure, including creation and/or use of an encoder model 110 based on a decoder model 112 that performs an inverse transformation relative to the encoder model 110.

The computing device 100 can be any type of computing device, including a personal computer (e.g., desktop or laptop), a mobile computing device (e.g., smartphone or tablet), an embedded computing device, a server computing device, or other forms of computing devices. The computing device 100 can include one or more processors 102 and a memory 104. The one or more processors 102 can be any suitable processing device (e.g., a processor core, a microprocessor, an ASIC, a FPGA, a controller, a microcontroller, etc.) and can be one processor or a plurality of processors that are operatively connected. The memory 104 can include one or more non-transitory computer-readable storage mediums, such as RAM, ROM, EEPROM, EPROM, flash memory devices, magnetic disks, etc., and combinations thereof. The memory 104 can store data 106 and instructions 108 which are executed by the processor 102 to cause the computing device 100 to perform operations.

The computing device 100 stores or otherwise includes one or more machine-learned encoder models 110. For example, the encoder model 110 can be or can otherwise include various machine-learned models such as one or more neural networks (e.g., deep neural networks) or other multi-layer non-linear models. The encoder model 110 can be trained according to the techniques described by the present disclosure.

The computing device 100 also stores or otherwise includes one or more decoder models 112. For example, the decoder model 112 can be a hand-crafted algorithm or can be a machine-learned model, such as a neural network. The decoder model 112 can perform an inverse transformation relative to the encoder model 110.

The computing device 100 can include a model trainer 114 that trains the encoder model 110 using various training or learning techniques, such as, for example, backwards propagation. For example, the model trainer 114 can train the encoder model 110 by sequentially backpropagating a loss function through the decoder model 112 without modifying the decoder model 112 and then through the encoder model 110 to modify at least one weight of the encoder model 110.

The model trainer 114 can include computer logic utilized to provide desired functionality. The model trainer 114 can be implemented in hardware, firmware, and/or software controlling a general purpose processor. For example, in some implementations, the model trainer 114 includes program files stored on a storage device, loaded into a memory and executed by one or more processors. In other implementations, the model trainer 114 includes one or more sets of computer-executable instructions that are stored in a tangible computer-readable storage medium such as RAM hard disk or optical or magnetic media.

Thus, the computing device 100 can train the encoder model 110 locally and in the field and is, therefore, not required to communicate with another device to enable training of the encoder model 110.

Figure 1B:
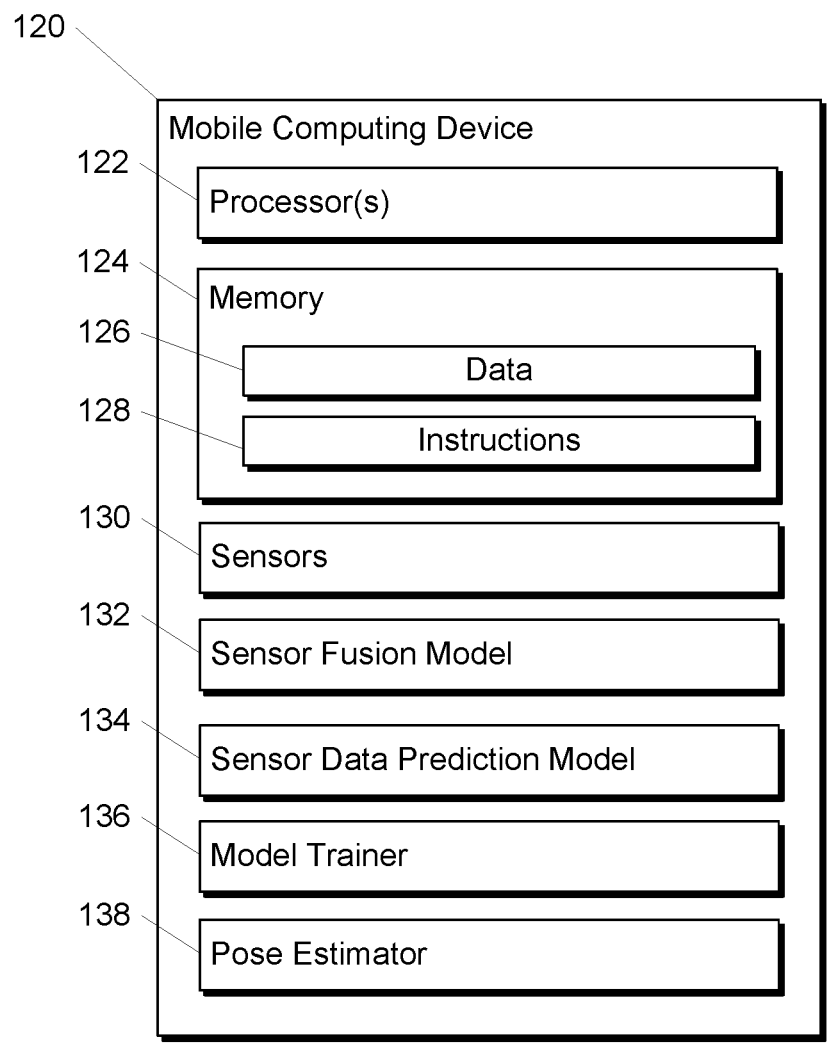

FIG. 1B depicts a block diagram of an example mobile computing device 120 according to example embodiments of the present disclosure. The mobile computing device 120 can be configured or operable to perform aspects of the present disclosure, including creation and/or use of a sensor fusion model 132 based on a sensor data prediction model 134 that performs an inverse transformation relative to the sensor fusion model 132.

The computing device 100 can be any type of mobile computing device, including, for example, a smartphone, a tablet, an embedded computing device, a wearable computing device, a portable computing device, a computing device included in a vehicle such as an automobile, an aircraft, or a watercraft, or other types of mobile computing devices. Further, the mobile computing device 120 of FIG. 1B is only one example instance in which a sensor fusion model can be trained and used. A sensor fusion model can be trained and/or used in non-mobile computing devices, as well.

The mobile computing device 120 can include one or more processors 122 and a memory 124. The one or more processors 122 can be any suitable processing device (e.g., a processor core, a microprocessor, an ASIC, a FPGA, a controller, a microcontroller, etc.) and can be one processor or a plurality of processors that are operatively connected. The memory 104 can include one or more non-transitory computer-readable storage mediums, such as RAM, ROM, EEPROM, EPROM, flash memory devices, magnetic disks, etc., and combinations thereof. The memory 124 can store data 126 and instructions 128 which are executed by the processor 122 to cause the mobile computing device 120 to perform operations. For example, that data 126 can include readings collected from one or more sensors 130 included in the mobile computing device.

The sensors 130 can be any type of sensor, including, for example, sensors that provide or output readings or other data regarding environmental conditions. Example sensors 130 can include one or more accelerometers, one or more magnetometers, a global positioning system, one or more gyroscopes, one or more inertial motion units, one or more odometers, one or more barometers, one or more cameras, one or more microphones, one or more touch-sensitive sensors, or any other type of sensors.

The computing device 100 stores or otherwise includes one or more machine-learned sensor fusion models 132. For example, the sensor fusion model 132 can be or can otherwise include various machine-learned models such as one or more neural networks (e.g., deep neural networks) or other multi-layer non-linear models. The sensor fusion model 132 can be trained according to the techniques described by the present disclosure.

The computing device 100 also stores or otherwise includes one or more sensor data prediction models 134. For example, the sensor data prediction model 134 can be a hand-crafted algorithm or can be a machine-learned model, such as a neural network. The sensor data prediction model 134 can perform an inverse transformation relative to the sensor fusion model 132.

The computing device 100 can include a model trainer 136 that trains the sensor fusion model 132 using various training or learning techniques, such as, for example, backwards propagation. For example, the model trainer 136 can train the sensor fusion model 132 by sequentially back-propagating a loss function through the sensor data prediction model 134 without modifying the sensor data prediction model 134 and then through the sensor fusion model 132 to modify at least one weight of the sensor fusion model 132.

In some implementations, the mobile computing device 138 can also include a pose estimator 138. The pose estimator 138 can estimate a pose of the mobile computing device 120 based on received data. For example, the pose estimator 138 can estimate a pose of the mobile computing device 120 based on data received from the sensors 130 and/or the sensor fusion model 132.

In one example, the sensor fusion model 132 outputs pose data that describes a predicted pose of the mobile computing device. In some implementations, the pose estimator 138 can accept and use without modification the predicted pose provided by the sensor fusion model 132. In other implementations, the pose estimator 138 can use the predicted pose provided by the sensor fusion model 132 as one input of several when estimating the pose of the device 120.

Each of the model trainer 136 and the pose estimator 138 can include computer logic utilized to provide desired functionality. Each of the model trainer 136 and the pose estimator 138 can be implemented in hardware, firmware, and/or software controlling a general purpose processor. For example, in some implementations, each of the model trainer 136 and the pose estimator 138 includes program files stored on a storage device, loaded into a memory and executed by one or more processors. In other implementations, each of the model trainer 136 and the pose estimator 138 includes one or more sets of computer-executable instructions that are stored in a tangible computer-readable storage medium such as RAM hard disk or optical or magnetic media.

Thus, the mobile computing device 120 can train the sensor fusion model 132 locally and in the field and is, therefore, not required to communicate with another device to enable training of the sensor fusion model 132. The mobile computing device 120 can periodically retrain the sensor fusion model 132 to train the sensor fusion model 132 to recognize changes in the data output by the sensors 130 (e.g., changes in the sources or character of noise) over time.

Figure 1C:
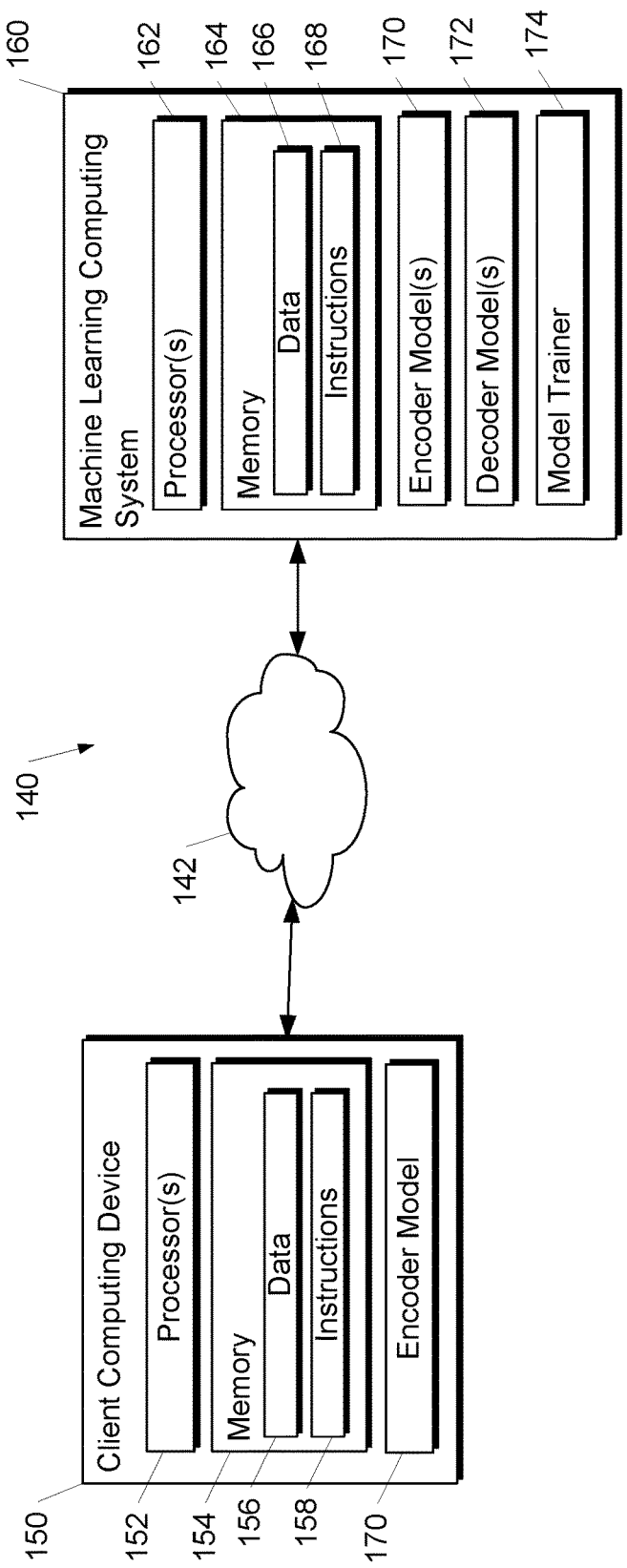

FIG. 1C depicts a block diagram of an example computing system 140 according to example embodiments of the present disclosure. The system 140 includes a client computing device 150 and a machine learning computing system 160 that are communicatively connected over a network 142. Although only a single client computing device 150 is shown, any number of client computing devices 150 can be connected to the machine learning computing system 160 over the network 142.

The machine learning computing system 160 includes one or more processors 162 and a memory 164. The one or more processors 162 can be any suitable processing device (e.g., a processor core, a microprocessor, an ASIC, a FPGA, a controller, a microcontroller, etc.) and can be one processor or a plurality of processors that are operatively connected. The memory 164 can include one or more non-transitory computer-readable storage mediums, such as RAM, ROM, EEPROM, EPROM, flash memory devices, magnetic disks, etc., and combinations thereof. The memory 164 can store data 166 and instructions 168 which are executed by the processor 162 to cause the machine learning computing system 160 to perform operations.

In some implementations, the machine learning computing system 160 includes or is otherwise implemented by one or more server computing devices. In instances in which the machine learning computing system 160 includes plural server computing devices, such server computing devices can operate according to sequential computing architectures, parallel computing architectures, or some combination thereof.

The machine learning computing system 160 stores or otherwise includes one or more machine-learned encoder models 170. For example, the encoder models 170 can be or can otherwise include various machine-learned models such as neural networks (e.g., deep neural networks) or other multi-layer non-linear models.

In some implementations, the system 160 can store a plurality of encoder models 170 that respectively correspond to a plurality of client computing devices 150. In some implementations, the plurality of encoder models 170 can be respectively trained on data that is specific to the corresponding client computing device 150. For example, the input data used to train each encoder model 170 can be received from the corresponding client computing device 150. Such can enable, for example, device-specific training of encoder models 170 such as device-specific sensor fusion models.

The machine learning computing system 160 also stores or otherwise includes one or more decoder models 172. For example, the decoder models 172 can be one or more hand-crafted algorithms or can be machine-learned models, such as neural networks. The decoder models 172 can perform inverse transformations relative to the encoder models 170. In some implementations, a single decoder model 172 can be used to train each of a plurality of device-specific encoder models 170.

The machine learning computing system 160 can include a model trainer 160 that trains the machine-learned encoder models 170 using various training or learning techniques, such as, for example, backwards propagation. In some implementations, the input data used to train the models 170 can be provided or otherwise selected by the client computing device 150.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The system 140 further includes the client computing device 150 communicatively coupled over the network 142. The client computing device 150 can be any type of computing device, such as, for example, a personal computing device (e.g., laptop or desktop), a mobile computing device (e.g., smartphone or tablet), a server computing device, or any other type of computing device.

The client computing device 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the client computing device 150 to perform operations.

The client computing device 150 can receive the model 170 from the machine learning computing system 160 after it has been trained by the model trainer 174 based on the decoder model 172. The client computing device 150 can store the encoder model 170 and use it to make predictions regarding new input data. The client computing device 150 can periodically communicate with the machine learning computing system 160 to update or otherwise re-train the encoder model 170.

The network 142 can be any type of communications network, such as a local area network (e.g., intranet), wide area network (e.g., Internet), or some combination thereof and can include any number of wired or wireless links. In general, communication over the network 142 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Example Model Arrangements

Figure 2:
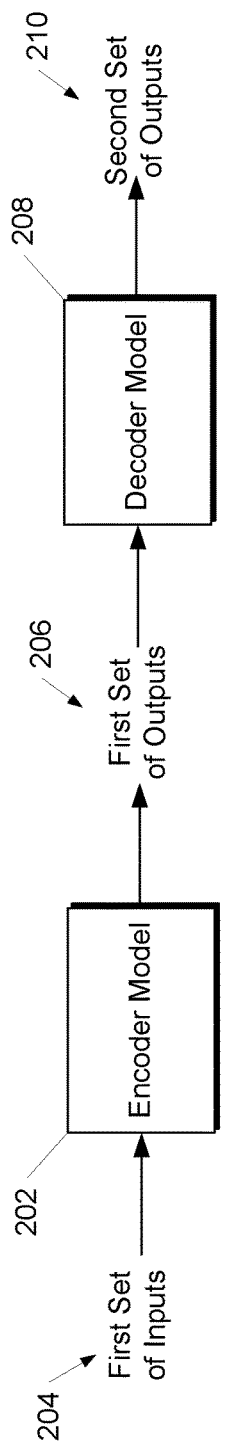
FIG. 2 depicts a block diagram of an example model arrangement according to example embodiments of the present disclosure.

FIG. 2 depicts a block diagram of an example model arrangement according to example embodiments of the present disclosure. The model arrangement includes an encoder model 202 that configured to receive a first set of inputs 204 and, in response to receipt of the first set of inputs 204, output a first set of outputs 206. The encoder model 202 can be, for example, a neural network such as a deep neural network or other multi-layer non-linear model.

In some implementations, the first set of inputs 204 can be expressed according to a first set of dimensions and the first set of outputs 206 can be expressed according to a second set of dimensions that are different than the first set of dimensions. The second set of dimensions can include a relatively smaller number of dimensions that the first set of dimensions or vice versa. Further, in some implementations, the first set of inputs 204 can include unlabeled, real-world data that includes noise.

The example model arrangement of FIG. 2 further includes a decoder model 208 that can perform an inverse transformation relative to the encoder model 202. In particular, the decoder model 208 can be configured to receive the first set of outputs 206 and, in response to receipt of the first set of outputs 206, output a second set of outputs 210. In some implementations, the second set of outputs 210 can be expressed according to the first set of dimensions. Thus, in some implementations, while the encoder model 202 transforms data from the first set of dimensions to the second set of dimensions, the decoder model 208 transforms data from the second set of dimensions back into the first set of dimensions. As such, the decoder model 208 can be said to have performed an inverse transformation relative to the encoder model 206.

In this respect, the example model arrangement of FIG. 2 is in some respects similar to an autoencoder. For example, an autoencoder can typically include an encoder portion and a decoder portion. However, autoencoders are typically trained to attempt to exactly reconstruct the original inputs. That is, the decoder portion of an autoencoder is actively trained to and attempts to exactly reconstruct the inputs that were actually provided to the encoder portion of the autoencoder.

However, according to aspects of present disclosure, the decoder model 208 of FIG. 2 is not trained and does not attempt to exactly reconstruct the first set of inputs 204 that were actually provided to the encoder model 202. Instead, in some implementations, the decoder model 208 of FIG. 2 attempts to provide a second set of outputs 210 that recreate a hypothetical, ideal first set of inputs that could have resulted in or otherwise correspond to the first set of outputs 206 that were output by the encoder model 202. By training the encoder model 202 to minimize a loss between the actual inputs 204 and such hypothetical, ideal inputs, the encoder model 202 can learn to identify and ignore portions of the actual inputs 204 that are not ideal or otherwise inaccurate, such as, for example, noise contained within the actual inputs.

Figure 3:
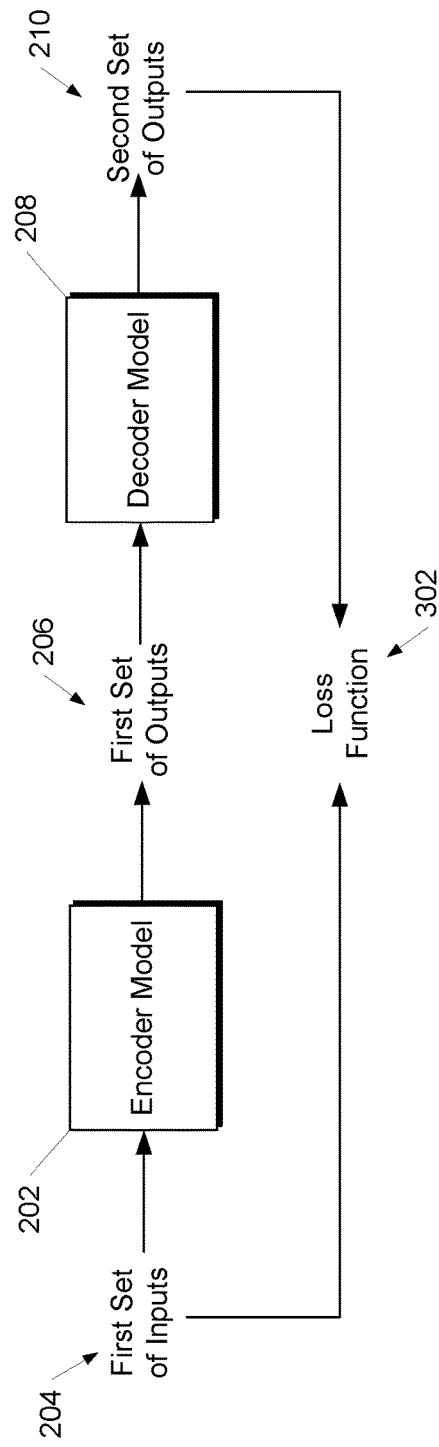
FIG. 3 depicts a block diagram of an example loss function according to example embodiments of the present disclosure.

More particularly, FIG. 3 depicts a block diagram of an example loss function 302 defined between the first set of inputs 204 from FIG. 2 and the second set of outputs 210 from FIG. 2. The loss function 302 can describe a difference between the first set of inputs 204 and the second set of outputs 210. For example, the loss function 302 can be a squared difference between the first set of inputs 204 and the second set of outputs 210 (e.g., a sum of a squared difference for each dimension in the first set of dimensions). However, loss functions other than a squared difference can be used as well, including, for example, loss functions that include various weightings (e.g., a particular weight applied to each dimension in the first set of dimensions).

FIG. 4 depicts a block diagram of an example model training technique according to example embodiments of the present disclosure. More particularly, to train the encoder model 202, the loss function 302 can be sequentially backpropagated through the decoder model 208 without modifying the decoder model 208 and then through the encoder model 202 while modifying the encoder model 202, thereby training the encoder model 202 to provide outputs that minimize the difference between the first set of inputs 204 and the second set of outputs 210.

In some implementations, machine learning tools such as TensorFlow and/or Theano can be used to perform the backpropagation of the loss function 302 illustrated in FIG. 4. As one example, backpropagation of the loss function 302 through the decoder model 208 without modification of the decoder model 208 can be performed by: programming the decoder model 208 as a graph or series of one or more operations or nodes; setting one or more learnable flags associated with the decoder model 208 to false; and then backpropagating the loss function through the decoder model 208. By contrast, one or more learnable flags associated with the encoder model 202 can be set to true to allow modification of the encoder model 202 during backpropagation of the loss function 302 through the encoder model 202.

FIG. 5 depicts a block diagram of an example model arrangement according to example embodiments of the present disclosure. The model arrangement illustrated in FIG. 5 includes a sensor fusion model 506 that receives a first set of sensor data 504 from one or more sensors 502. For example, the sensors 502 can be the same as or similar to sensors 130 discussed with reference to FIG. 1B.

More particularly, the sensor fusion model 502 can receive the first set of sensor data 504 reported by the one or more sensors 502 as an input. In response to receipt of the first set of sensor data 504, the sensor fusion model 506 can output a set of condition data 508. The set of condition data 508 can be descriptive of a condition that is evidenced by the first set of sensor data 504.

In one particular example, the one or more sensors 502 can include one or more of an accelerometer, a magnetometer, a global positioning system, a gyroscope, an inertial motion unit, an odometer, etc., while the set of condition data 508 can be a set of pose data that describes a pose of a mobile device that includes the one or more sensors 502. For example, the set of pose data can be a set of six degree of freedom pose data that describes the pose of the mobile device in six degrees of freedom.

Thus, in general, the sensor fusion model 506 can receive a first set of sensor data 504 as inputs and, in response to receipt of the first set of sensor data 504, output a set of condition data 508 that describes a condition (e.g., a device pose) that is evidenced by the first set of sensor data 504.

Such a sensor fusion model 506 is useful in a large number of various scenarios, including as examples, pose estimation, image fusion, system and/or component condition monitoring or anomaly detection, or any other scenario in which the processing of multiple sources or types of sensor data to reach a conclusion is useful. However, creation of an accurate and robust sensor fusion model is a challenging process. In particular, sensor fusion models have traditionally taken the form of a hand-crafted sensor fusion algorithm that combines a number of techniques to attempt to fuse the sensor data. For example, in the case of pose estimation, the merging of data from inertial measurement units with noisy absolute position sensors (e.g., a global positioning system) normally involves the use of coordinate transforms, a pose estimation technique (e.g., SolvePNP and Kalman filters), and/or other techniques. These techniques can include a number of tunable parameters which can require significant amounts of tuning (e.g., manual adjustment) to eventually arrive at a usable sensor fusion model.

However, according to aspects of the present disclosure, a sensor fusion model 506 of the present disclosure can be implemented as a machine-learned model (e.g., a neural network) rather than taking the form of a traditional hand-crafted sensor fusion algorithm. Typically, training such a machine-learned sensor fusion model would require a labelled training set in which a set of training sensor data is labelled with known ground truths. However, the systems and methods of the present disclosure can train such a machine-learned sensor fusion model 506 based on an inverse model, thereby enabling training of the sensor fusion model without ground truth data, and further enabling training of the sensor fusion model as it is used in the field with real sensor data.

In particular, consider the inverse to the sensor fusion model 506, which can be referred to as a sensor data prediction model 510. The sensor data prediction model 510 can receive as inputs the set of condition data 508 that was output by the sensor fusion model 506. In response to receipt of the set of condition data 508, the sensor data prediction model 510 can predict a second set of sensor data 512. In some implementations, the second set of sensor data 512 can include or represent sensor readings that would be expected to result from the condition described by the set of condition data 508. Thus, the sensor data prediction model 510 can perform an inverse transformation relative to the sensor fusion model 506.

For example, in the case of pose estimation, the sensor data prediction model 510 can be a model that takes a series of poses (e.g., six degree of freedom positions) that represents the motion of the plurality of sensors through space and then computes the acceleration, rotation, or other sensor values expected to result from such series of poses/motion if the sensors were ideally operating. Stated differently, the sensor data prediction model 510 provides a second set of sensor data 512 that represents what an ideal set of sensors should have reported in light of experiencing the series of poses. Thus, in response to receipt of the set of pose data, the sensor data prediction model 510 can output a second set of sensor data 512 that represents what an ideal set of sensors should have reported given the set of pose data.

In some instances, the sensor data prediction model 510 can be easier to produce or otherwise create than the sensor fusion model 506. For example, in some instances, the sensor fusion model 506 may be required to perform dimensionality reduction or to make some judgments regarding the value or weight of some input sensor data relative to other input sensor data (e.g., identify and disregard sensor noise). On the other hand, the sensor data prediction model 510 may only be required to compute expected sensor readings that would result from the condition described by the output of the sensor fusion model 506. Such computation of expected sensor readings may require only the application of known principles or relationships between the condition, which represents harmonized input data, and the expected sensor readings.

As one example, in the case of pose estimation, the sensor data prediction model 510 is easier to create than the sensor fusion model 506 because the set of pose data input into the sensor data prediction model 510 comes in a canonical reference frame (e.g., six degrees of freedom) and represents harmonized input data. For example, calculation of acceleration from one known pose to another known pose requires only application of well-known principles of physics. By comparison, the sensor fusion model 506 is required to harmonize a plurality of different noisy sensors and transform such sensor data 504 into the reference frame (e.g., six degrees of freedom), which is a much more difficult task. Thus, the present disclosure can be particularly beneficial in any scenario in which generation of an accurate version of the decoder model represents a relatively easier task than generation of an accurate version of the encoder model.

According to aspects of the present disclosure, the sensor fusion model 506 can be trained based at least in part on the output of a sensor data prediction model 510 that received as input the output of the sensor fusion model 506. Thus, rather than attempting to create synthetic or ground truth training data, consistency can be enforced between the sensor fusion model 506 and its inverse sensor data prediction model 510.

To provide one example of such principle, to train the sensor fusion model 506, the set of condition data 508 (e.g., set of pose data) output by the sensor fusion model 506 can be input into the sensor data prediction model 510. As described, the sensor data prediction model 510 can then output a second set of sensor data 512 that includes sensor readings that would be expected to result from the condition described by the set of condition data 508 output by the sensor fusion model 506. For example, in the instance of pose estimation, the sensor data prediction model 510 predicts what ideal sensors would have reported based on poses (e.g., a sequence of six degree of freedom poses) described by the set of pose data output by the sensor fusion model 506.

A loss function can describe a difference between the first set of sensor data 504 and the second set of sensor data 512. For example, the loss function can be a squared difference between the sets of sensor data 504 and 512. To train the sensor fusion model 506, the loss function can be sequentially backpropagated through the sensor data prediction model 510 without modifying the sensor data prediction model 510 and then through the sensor fusion model 506 while modifying the sensor fusion model 506, thereby training the sensor fusion model 506 to provide outputs 508 that minimize the difference between the first set of actual sensor data 504 and the second set of ideal sensor data 512.

In effect, the sensor fusion model 506 is trained to produce a set of condition data 508 that reflects conditions that could have produced the sensor readings that were provided to the sensor fusion model 506. For example, in the case of pose estimation, the sensor fusion model 506 is trained to produce a set of pose data that describes a series of poses (e.g., six degree of freedom poses) that could have produced the sensor readings it was provided.

One advantage of the above described technique is that all real-world sensor data 504 can be used to refine the sensor fusion model 506, thereby allowing the sensor fusion model 506 to be trained in the field and to respond to changes in the sensors 502 over time. Thus, the systems and methods of the present disclosure eliminate the need for ground truth condition data from an external measurement system. In addition, the systems and methods of the present disclosure eliminate the need to manually adjust hand-tuned sensor fusion algorithms. Instead, the sensor fusion model 506 can be quickly trained in the field using real-world sensor data.

Figure 6:
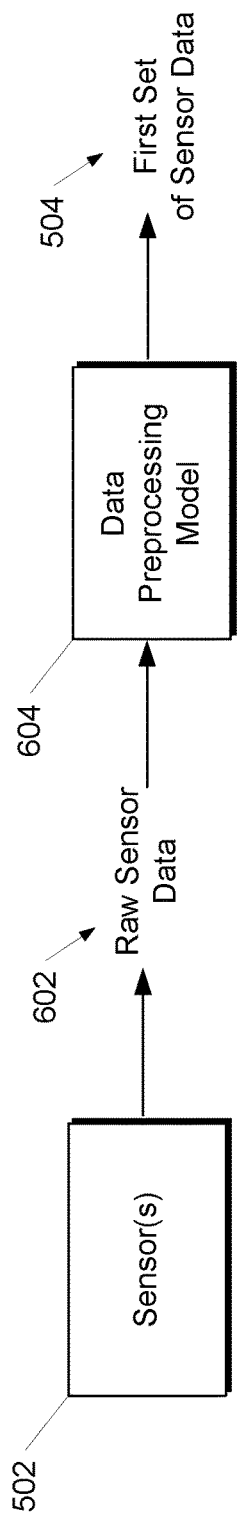
FIG. 6 depicts a block diagram of an example model arrangement according to example embodiments of the present disclosure.

FIG. 6 depicts a block diagram of an example model arrangement according to example embodiments of the present disclosure. More particularly, in some implementations, a data preprocessing model 604 can be used to preprocess data received from the one or more sensors 502 illustrated in FIG. 5 prior to inputting the sensor data into the sensor fusion model 506. In particular, the data preprocessing model 604 can receive raw sensor data 602 from the one or more sensors 502.

The data preprocessing model 604 can process the raw sensor data 602 to create the first set of sensor data 504. The first set of sensor data 504 can then be input into the sensor fusion model 506, as discussed with reference to FIG. 5. In implementations which include a preprocessing model 604, the loss function can still be defined between the first set of sensor data 504 and the second set of sensor data 512.

In some implementations, the data preprocessing model 604 can leverage knowledge of the fact that certain sensors (e.g., accelerometers and/or gyroscopes) exhibit a relatively constant error. Thus, the data processing model 604 can correct for such constant error. As one example, the data processing model 604 can be a smoothing model that smoothes the raw sensor data 602 to form the first set of sensor data 504.

However, in some instances, such a smoothing model can create a self-fulfilling feedback loop. To accommodate such problem, in some implementations, the data processing model 604 can be a bounded smoothing model. The bounded smoothing model can correct for an expected kind of error, but only within bounded limits. As one example, in some implementations, the bounded smoothing model may change the raw sensor data 602 by only a certain maximally bounded percentage (e.g., a maximum of 10%). As another example, in some implementations, the bounded smoothing model can average values but may not leave values constant.

Figure 7:
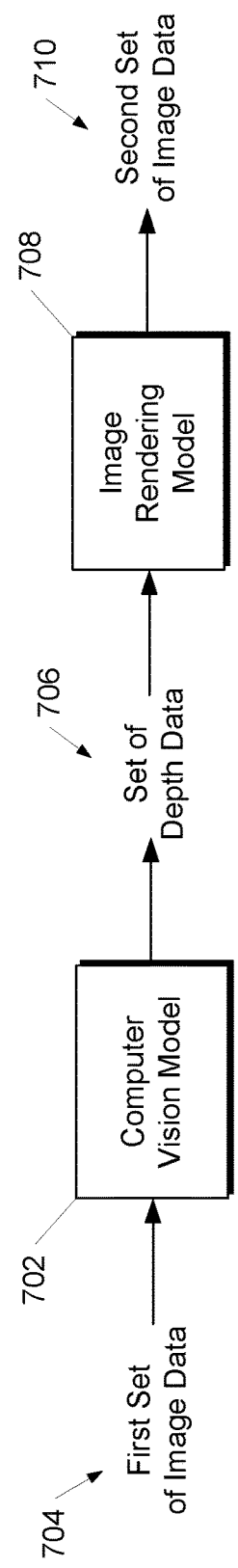
FIG. 7 depicts a block diagram of an example model arrangement according to example embodiments of the present disclosure.

FIG. 7 depicts a block diagram of an example model arrangement according to example embodiments of the present disclosure. More particularly, in another example application of the present disclosure, the encoder model can be a computer vision model 702. In particular, the computer vision model 702 can receive a first set of image data 704 that is descriptive of one or more first frames of imagery that depict a scene. In response to receipt of the first set of image data 704, the computer vision model 702 can output a set of depth data 706 that describes one or more depths associated with the scene depicted by the first frames of imagery. The inverse decoder model can be an image rendering model 708 that receives the set of depth data 706 and predicts a second set of image data 710. The second set of image data 710 can include one or more second frames of imagery that depict the expected appearance of the scene in view of the set of depth data 706. Thus, the computer vision model 702 can infer depth from a series of frames while the image rendering model can render what the frames should have looked like given the depth information produced by the computer vision model. The computer vision model 702 can be trained as described herein using a loss function that describes a difference between the first set of image data 704 and the second set of image data 710.

Figure 8:
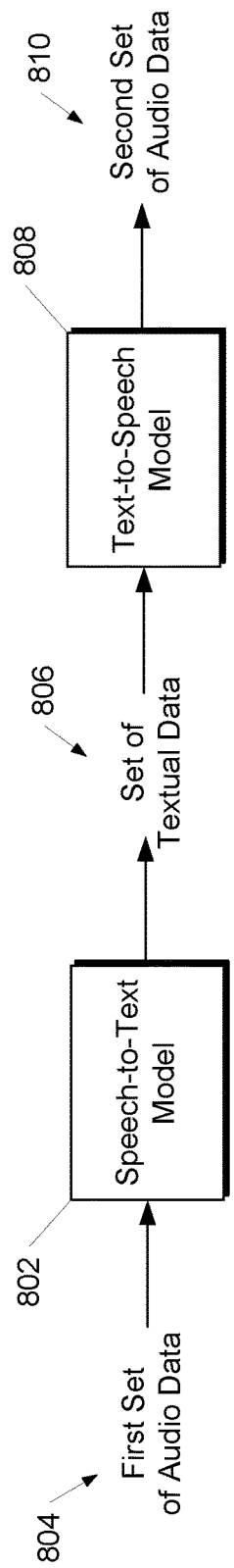
FIG. 8 depicts a block diagram of an example model arrangement according to example embodiments of the present disclosure.

FIG. 8 depicts a block diagram of an example model arrangement according to example embodiments of the present disclosure. More particularly, in another example application of the present disclosure, the encoder model can be a speech-to-text model 802. In particular, the speech-to-text model 802 can receive a first set of audio data 804 that is descriptive of an utterance. In response to receipt of the first set of audio data 804, the speech-to-text model 8082 can output a set of textual data 806 that provides a textual transcript of the utterance. The inverse decoder model can be a text-to-speech model 808 that receives the set of textual data 806 and predicts a second set of audio data 810 that includes a recreated utterance of the textual transcript. The speech-to-text model 802 can be trained as described herein using a loss function that describes a difference between the first set of audio data 804 and the second set of audio data 810.

In some implementations, the synthesized voice of the text-to-speech model 808 may be different from the original speaker's voice. Thus, in some implementations, in addition to the textual data 806, the speech-to-text model 802 can also output data that describes an inflection, a voice, or other characteristics associated with the utterance described by the original audio data 804. The text-to-speech model 808 can use such additional data in simulating the original speaker's inflection, voice, and/or other characteristics to produce the second set of audio data 810.

Example Methods

Figure 9:
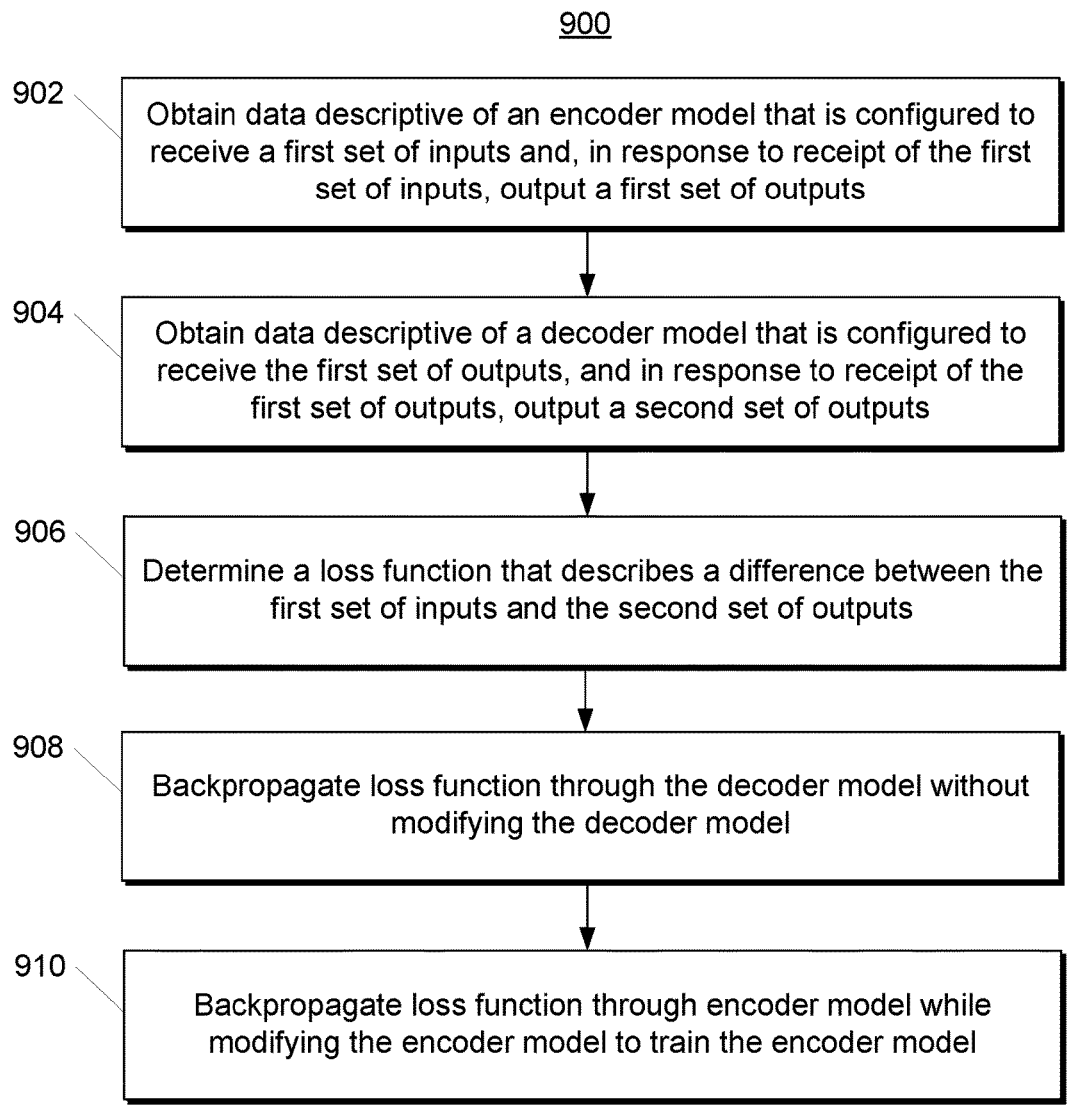
FIG. 9 depicts a flow chart diagram of an example method to perform machine learning according to example embodiments of the present disclosure.

FIG. 9 depicts a flow chart diagram of an example method to perform machine learning according to example embodiments of the present disclosure.

At 902, one or more computing devices obtain data descriptive of an encoder model that is configured to receive a first set of inputs and, in response to receive of the first set of inputs, output a first set of outputs. In some implementations, the encoder model is configured to receive the first set of inputs expressed according to a first set of dimensions; and output the first set of outputs expressed according to a second set of dimensions that are different from the first set of dimensions. In some implementations, the encoder model is a neural network.

At 904, the one or more computing devices obtain data descriptive of a decoder model that is configured to receive the first set of outputs and, in response to receipt of the first set of outputs, output a second set of outputs. In some implementations, the decoder model is configured to output the second set of outputs expressed according to the first set of dimensions.

At 906, the one or more computing devices determine a loss function that describes a difference between the first set of inputs and the second set of outputs. For example, the loss function can be a squared difference between the first set of inputs and the second set of outputs.

At 908, the one or more computing devices backpropagate the loss function through the decoder model without modifying the decoder mode. As one example, to backpropagate the loss function through the decoder model without modifying the decoder model, the one or more computing devices can: represent the decoder model 208 as a graph or series of one or more operations or nodes; set one or more learnable flags associated with the decoder model 208 to false; and then backpropagating the loss function through the decoder model 208.

At 910, the one or more computing devices continue to backpropagate the loss function through the encoder model while modifying the encoder model to train the encoder model. For example, modifying the encoder model can include adjusting at least one weight of the encoder model.

Figure 10:
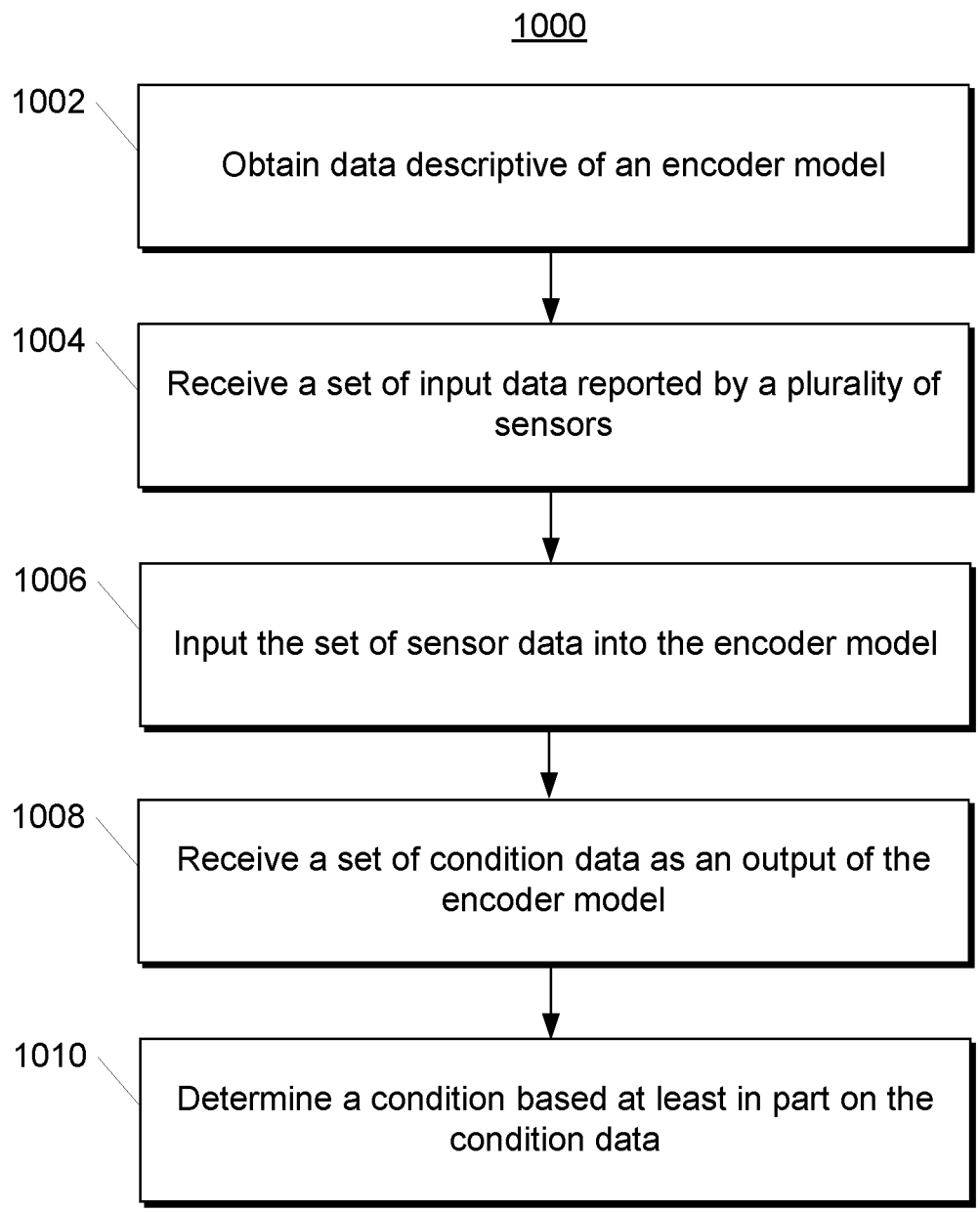
FIG. 10 depicts a flow chart diagram of an example method to perform machine learning according to example embodiments of the present disclosure.

FIG. 10 depicts a flow chart diagram of an example method to perform machine learning according to example embodiments of the present disclosure.

At 1002, one or more computing devices obtain data descriptive of an encoder model. For example, the encoder model can be a sensor fusion model. The encoder model can have been trained by sequentially backpropagating a loss function through a decoder model without modifying the decoder model and then through the encoder model to modify at least one weight of the encoder model. The decoder model can be configured to perform an inverse transformation relative to the encoder model. The loss function can describe a difference between a first set of inputs to the encoder model and a second set of outputs output by the decoder model.

At 1004, the one or more computing devices receive a set of input data reported by a plurality of sensors. At 1006, the one or more computing devices input the set of sensor data into the encoder model.

At 1008, the one or more computing devices receive a set of condition data as an output of the encoder model. For example, the set of condition data can describe a condition evidenced by the set of input data reported by the plurality of sensors. In one example, the set of condition data can be a set of pose data that describes a pose of a mobile device that includes the sensors.

At 1010, the one or more computing devices determine a condition based at least in part on the condition data. For example, the one or more computing devices can accept, process, extract, or otherwise utilize the condition described by the set of condition data received from the encoder model at 1008. In one example, the one or more computing devices can use the pose described by the set of pose data as indicative of the pose of the mobile device that includes the sensors.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 9 and 10 respectively depict steps performed in a particular order for purposes of illustration and discussion, the methods of the present disclosure are not limited to the particularly illustrated order or arrangement. The various steps of the methods 900 and 1000 can be omitted, rearranged, combined, and/or adapted in various ways without deviating from the scope of the present disclosure.

What is claimed is:
1. A computer-implemented method to perform machine learning, the method comprising:
 obtaining, by one or more computing devices, data descriptive of an encoder model that is configured to receive a first set of inputs and, in response to receipt of the first set of inputs, output a first set of outputs;
 obtaining, by the one or more computing devices, data descriptive of a decoder model that is configured to receive the first set of outputs and, in response to receipt of the first set of outputs, output a second set of outputs;
 determining, by the one or more computing devices, a loss function that describes a difference between the first set of inputs and the second set of outputs;

backpropagating, by the one or more computing devices, the loss function through the decoder model without modifying the decoder model; and after backpropagating, by the one or more computing devices, the loss function through the decoder model, continuing to backpropagate, by the one or more computing devices, the loss function through the encoder model to train the encoder model;

wherein continuing to backpropagate, by the one or more computing devices, the loss function through the encoder model to train the encoder model comprises adjusting, by the one or more computing devices, at least one weight included in the encoder model.

2. The computer-implemented method of claim 1, wherein:

the encoder model is configured to:
  receive the first set of inputs expressed according to a first set of dimensions; and
  output the first set of outputs expressed according to a second set of dimensions that are different from the first set of dimensions; and
the decoder model is configured to output the second set of outputs expressed according to the first set of dimensions.

3. The computer-implemented method of claim 1, wherein at least the encoder model comprises a neural network.

4. The computer-implemented method of claim 1, wherein the encoder model comprises a sensor fusion model that is configured to:
  receive a set of sensor data as the first set of inputs, the set of sensor data reported by a plurality of sensors; and
  in response to receipt of the set of sensor data, output a set of condition data as the first set of outputs, the set of condition data descriptive of a condition evidenced by the set of sensor data.

5. The computer-implemented method of claim 4, wherein the decoder model comprises a sensor data prediction model that is configured to:
  receive the set of condition data; and
  in response to receipt of the set of condition data, predict a second set of sensor data, the second set of sensor data comprising sensor readings expected to result from the condition described by the set of condition data.

6. The computer-implemented method of claim 1, wherein the encoder model comprises a sensor fusion model that is configured to:
  receive a set of sensor data as the first set of inputs, the set of sensor data reported by a plurality of sensors of a mobile device; and
  in response to receipt of the set of sensor data, output a set of pose data as the first set of outputs, the set of pose data descriptive of a pose of the mobile device that includes the plurality of sensors.

7. The computer-implemented method of claim 6, wherein the set of pose data comprises a set of six degree of freedom pose data that describes the pose of the mobile device in six degrees of freedom.

8. The computer-implemented method of claim 6, wherein the decoder model comprises a sensor prediction model that is configured to:
  receive the set of pose data; and
  in response to receipt of the set of pose data, predict a second set of sensor data, the second set of sensor data comprising sensor readings expected to result from the pose of the mobile device.

9. The computer-implemented method of claim 8, further comprising:
  determining, by the one or more computing devices, the pose of the mobile device based at least in part on the set of pose data output by the sensor fusion model.

10. The computer-implemented method of claim 1, wherein the second set of outputs comprises an idealized version of the first set of inputs in which noise has been removed.

11. The computer-implemented method of claim 1, wherein the second set of outputs comprises a set of hypothetical inputs that correspond to the first set of outputs.

12. A computing system to perform machine learning, the computing system comprising:
  at least one processor; and
  at least one tangible, non-transitory computer-readable medium that stores instructions that, when executed by the at least one processor, cause the computing system to:
    obtain data descriptive of a model that comprises an encoder model and a decoder model, wherein the encoder model is configured to receive a first set of inputs and, in response to receipt of the first set of inputs, output a first set of outputs, and wherein the decoder model is configured to receive the first set of outputs and, in response to receipt of the first set of outputs, output a second set of outputs;
    determine a loss function that describes a difference between the first set of inputs and the second set of outputs;
    backpropagate the loss function through the decoder model without modifying the decoder model; and
    after backpropagating the loss function through the decoder model, continue to backpropagate the loss function through the encoder model while modifying the encoder model to train the encoder model.

13. The computing system of claim 12, wherein:
the encoder model comprises a sensor fusion model that is configured to:
  receive a set of sensor data as the first set of inputs, the set of sensor data reported by a plurality of sensors of a mobile device; and
  in response to receipt of the set of sensor data, output a set of pose data as the first set of outputs, the set of pose data descriptive of a pose of the mobile device that includes the plurality of sensors; and
the decoder model comprises a sensor prediction model that is configured to:
  receive the set of pose data; and
  in response to receipt of the set of pose data, predict a second set of sensor data, the second set of sensor data comprising sensor readings expected to result from the pose of the mobile device.

14. The computing system of claim 13, wherein:
the computing system consists of the mobile device;
the mobile device comprises the plurality of sensors, the at least one processor, and the at least one tangible, non-transitory computer-readable medium that stores the instructions; and
the at least one tangible, non-transitory computer-readable medium stores the model.

15. The computing system of claim 14, wherein execution of the instructions by the at least one processor further causes the mobile device to, after continuing to backpropagate the loss function through the sensor fusion model to train the sensor fusion model:

receive a third set of sensor data newly reported by the plurality of sensors;
input the third set of sensor data into the sensor fusion model;
receive a second set of pose data as an output of the sensor fusion model; and
determine a current pose of the mobile device based at least in part on the second set of pose data.

16. The computing system of claim 12, wherein:
the encoder model comprises a computer vision model that is configured to:
receive a set of image data as the first set of inputs, the set of image data descriptive of one or more first frames of imagery that depict a scene; and
in response to receipt of the set of image data, output a set of depth data as the first set of outputs, the set of depth data descriptive of one or more depths associated with the scene depicted by the one or more frames of imagery; and
the decoder model comprises an image rendering model that is configured to:
receive the set of depth data; and
in response to receipt of the set of depth data, predict a second set of image data, the second set of image data comprising one or more second frames of imagery that depict the expected appearance of the scene in view of the set of depth data.

17. The computing system of claim 12, wherein:
the encoder model comprises a speech-to-text model that is configured to:
receive a set of audio data as the first set of inputs, the set of audio data descriptive of an utterance; and
in response to receipt of the set of audio data, output a set of textual data as the first set of outputs, the set of textual data providing a textual transcript of the utterance; and
the decoder model comprises a text-to-speech model that is configured to:
receive the set of textual data; and
in response to receipt of the set of textual data, predict a second set of audio data, the second set of audio data comprising a recreated utterance of the textual transcript.

18. A computing system, comprising:
at least one processor; and
at least one memory that stores a machine-learned encoder model that is configured to receive a first set of inputs and output a first set of outputs, the encoder model having been trained by sequentially backpropagating a loss function through a decoder model without modifying the decoder model and then through the encoder model to modify at least one weight of the encoder model, the decoder model configured to receive the first set of outputs and output a second set of outputs, the loss function descriptive of a difference between the first set of inputs and the second set of outputs.

19. The computing system of claim 18, wherein the encoder model comprises a neural network.

20. The computing system of claim 18, wherein:
the encoder model comprises a sensor fusion model; and
the computing system is configured to:
receive a set of sensor data reported by a plurality of sensors of a mobile device;
input the set of sensor data into the sensor fusion model; and
receive a set of pose data as an output of the encoder model.

* * * * *